UNITED STATES PATENT OFFICE.

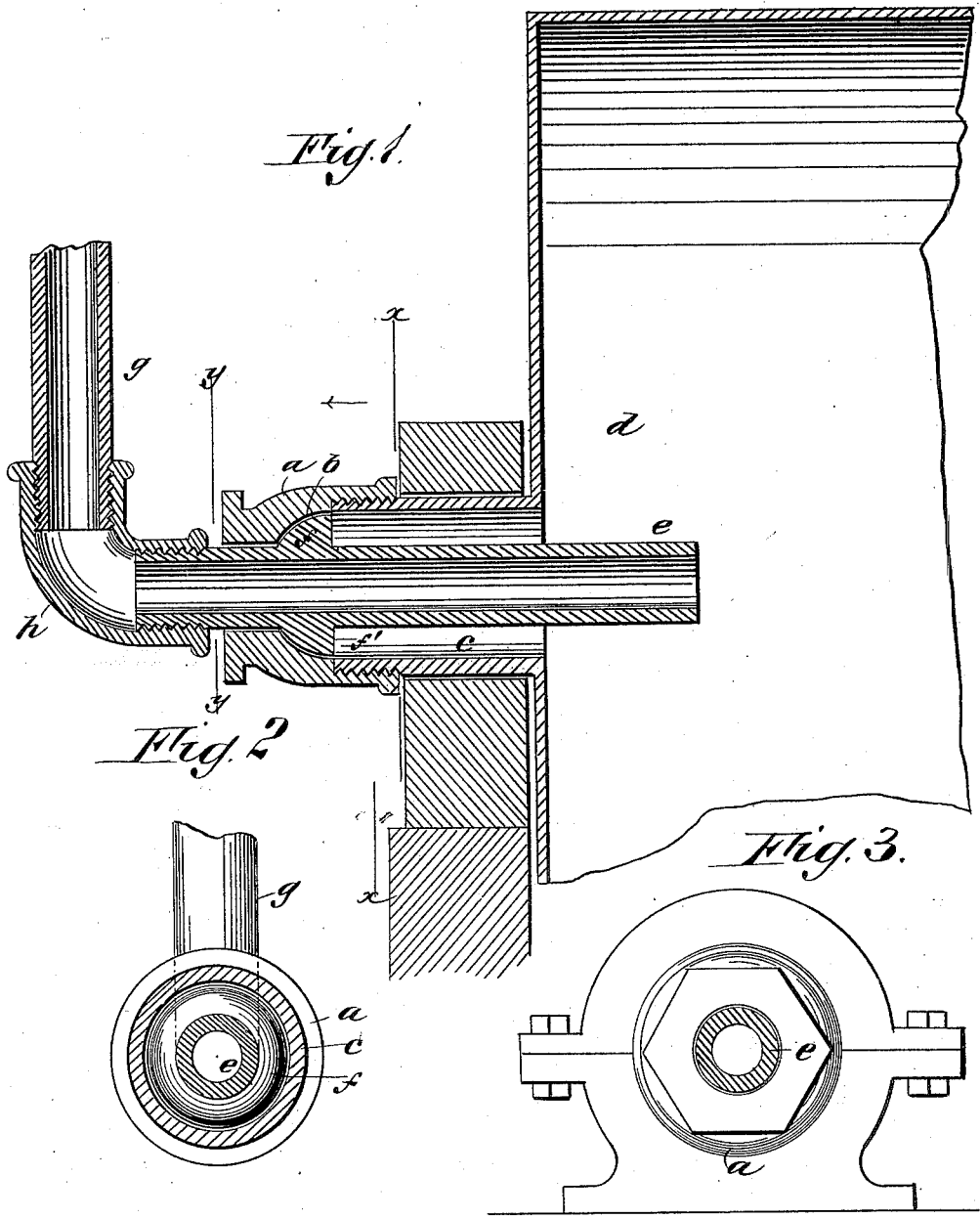

MICHAEL J. ROACH, OF LOCKPORT, NEW YORK.

STEAM-PIPE JOINT FOR ROTARY PAPER-DRYING CYLINDERS, &c.

SPECIFICATION forming part of Letters Patent No. 298,624, dated May 13, 1884.

Application filed January 4, 1884. (No model.)

*To all whom it may concern:*

Be it known that I, MICHAEL J. ROACH, of Lockport, in the county of Niagara and State of New York, have invented a new and Improved Steam-Pipe Joint for Rotary Paper-Drying Cylinders or Drums, of which the following is a full, clear, and exact description.

My invention consists of an improved metallic steam-pipe joint for revolving hollow drying cylinders or drums used in drying and bleaching paper, and other devices receiving and discharging steam through hollow journals, the said improved joint being contrived to be kept tight by the pressure of the steam within the cylinder and without the use of any special packing, and so that the joint is made by the pipe-connection itself, the said joint being adapted to wear tight and calculated to be very durable, as hereinafter fully described.

Reference is to be had to the accompanying drawings, forming part of this specification, in which similar letters of reference indicate corresponding parts in all the figures.

Figure 1 is a sectional elevation along the axis of a hollow journal and through my improved pipe-joint. Fig. 2 is a cross-section on the line $x\ x$ of Fig. 1, and Fig. 3 is a cross-section on the line $y\ y$.

I fit a gland, $a$, having a conical or oval seat, $b$, for a valve on the end of the hollow journal, $c$, of the hollow drum or roller $d$, and fit a short section, $e$, of steam-pipe with a valve, $f$, at a suitable point between its ends, or it may be at the inner end of said pipe, which valve is ground or otherwise fitted steam-tight to the seat $b$, said valve having sufficient area on the back $f'$, or inner end, for being pressed on seat $b$ and kept steam-tight by the back-pressure of the steam in the cylinder. From the valve $f$ said pipe $e$ extends outward through the gland sufficiently to have the steam-pipe $g$ connected to it by an elbow, $h$, union, or other coupling, which is to be screwed on sufficiently tight to prevent the valve from being turned by the friction of the gland, which revolves with the journal $c$, to which it must be screwed or bolted sufficiently tight to prevent being turned by the friction of the valve.

The pipe $e$ may be extended inward beyond the valve $f$ or not, as preferred.

While I prefer to make the valve and its seat conical or oval, I do not mean to limit myself to these forms, and I do not limit myself to the particular connections of the gland and steam-pipes which I have shown, as all these may be varied to some extent. For instance, the gland $b$, instead of being attached to the drum by a screw-thread, as shown, may be attached by flanges and bolts.

Having thus described my invention, I claim as new and desire to secure by Letters Patent—

1. In a steam-pipe joint for a hollow revolving journal, the gland $a$, attached to the journal $c$, and having a conical, oval, or equivalent valve-seat, $b$, in combination with a valve, $f$, of corresponding form, on the steam-pipe $e$, substantially as described.

2. The combination, with the journal of a hollow revolving cylinder having its end partly closed to form a valve-seat, of a steam-pipe passing into said journal, and having a valve formed upon it, fitting the valve-seat on the end of the journal, and said valve having a rear surface of sufficient area to insure its being seated by the steam-pressure, substantially as described.

MICHAEL J. ROACH.

Witnesses:
LAWRENCE J. McPARLIN,
JACOB FISHER.